(12) United States Patent
Hajj et al.

(10) Patent No.: US 7,460,660 B2
(45) Date of Patent: **\*Dec. 2, 2008**

(54) METHOD, SYSTEM, AND COMPUTER PROGRAM PRODUCT FOR PROVIDING WEB-BASED QUALITY ASSESSMENT, TRACKING, AND REPORTING SERVICES FOR CALL MONITORING

(75) Inventors: James L. Hajj, Chamblee, GA (US); Scott M. Berger, Atlanta, GA (US)

(73) Assignee: AT&T Intellectual Property, I, L.P., Wilmington, DE (US)

( \* ) Notice: Subject to any disclaimer, the term of this patent is extended or adjusted under 35 U.S.C. 154(b) by 235 days.

This patent is subject to a terminal disclaimer.

(21) Appl. No.: 11/610,700

(22) Filed: Dec. 14, 2006

(65) Prior Publication Data

US 2007/0127694 A1 Jun. 7, 2007

Related U.S. Application Data

(63) Continuation of application No. 10/648,424, filed on Aug. 25, 2003, now Pat. No. 7,203,305.

(51) Int. Cl.
*H04M 3/523* (2006.01)

(52) U.S. Cl. .............................. 379/265.06; 379/265.09

(58) Field of Classification Search . 379/265.01–266.1, 379/309; 709/223–227
See application file for complete search history.

(56) References Cited

U.S. PATENT DOCUMENTS

| | | | |
|---|---|---|---|
| 6,058,163 A | 5/2000 | Pattison et al. | |
| 6,263,049 B1 | 7/2001 | Kuhn | |
| 6,470,386 B1 | 10/2002 | Combar et al. | |
| 6,724,887 B1 \* | 4/2004 | Eilbacher et al. | 379/265.03 |
| 7,203,305 B1 \* | 4/2007 | Hajj et al. | 379/265.06 |
| 2005/0216421 A1 | 9/2005 | Barry et al. | |

\* cited by examiner

*Primary Examiner*—Harry S Hong
(74) *Attorney, Agent, or Firm*—Cantor Colburn LLP

(57) ABSTRACT

A method, system, and computer program product for providing web-based quality assessment, tracking, and reporting services for call monitoring are provided. The method includes presenting a main menu of user-selectable options via the evaluation services system over the web-based network. The user selectable options include a call monitoring option for requesting an evaluation of a call representative and a search option for searching completed call monitoring forms resulting from call monitoring sessions. The method also includes receiving a selection from the user-selectable options and presenting to a call monitor system, in response to selection of the call monitoring option, a call monitor form template over the web-based network.

20 Claims, 5 Drawing Sheets

Help Desk Observation Form

| Strategy/Initiative | | | | Category/Comments/Non-Compliance Reasons |
|---|---|---|---|---|
| Take Ownership | N/A | Yes | No | Comment: |
| Professional Greeting | | ● | ○ | |
| Communicates Appropriately | | ○ | ○ | |
| Listen Effectively | | ○ | ○ | |
| Display Empathy/Manner | | ○ | ○ | |
| No Gross Excessive Hold Time | | ● | ○ | |
| Followed Correct Hold Procedures | ● | ○ | ○ | |
| Professional Closing | ● | ○ | ○ | |
| No Gross Abuse | | ● | ○ | |
| Save Service | ● | ○ | ○ | |
| Do It Right | N/A | Yes | No | Comment: |
| Ask & Recap TN | | ○ | ○ | |
| Ask Name/Addr/Rlshp to Acct Holder | ● | ○ | ○ | |
| Correct Troubleshooting | ● | ○ | ○ | |
| Notations Made | ● | ○ | ○ | |
| Notations Correct | ● | ○ | ○ | |
| Quoted Dispatch Fee Disclosure | ● | ○ | ○ | |
| Issue Resolved | ● | ○ | ○ | |
| Dispatched Appropriately | ● | ○ | ○ | |
| RMA Quoted | ● | ○ | ○ | |
| Dispatch Code | ● | ○ | ○ | |
| Confirms Surf/Email | ● | ○ | ○ | |
| Knowledgeable | | ○ | ○ | |
| Meet Our Commitment | N/A | Yes | No | Comment: |
| Commitment Promised | ● | ○ | ○ | |
| Commitment Met | ● | ○ | ○ | |
| Make It Seamless | N/A | Yes | No | Comment: |
| Referral to External Resources | ● | ○ | ○ | |
| Escalated Properly | ● | ○ | ○ | |
| Transferred Appropriately | ● | ○ | ○ | |

Follow Up Actions

☐ Follow Up Required

Follow Up Reason(s):
Notations
Issue resolved
Commitment met
Repeat 3 days

Follow Up Description:
Comment:

Follow Up Date:

(Submit) (Reset)

*FIG. 4B*

METHOD, SYSTEM, AND COMPUTER PROGRAM PRODUCT FOR PROVIDING WEB-BASED QUALITY ASSESSMENT, TRACKING, AND REPORTING SERVICES FOR CALL MONITORING

CROSS-REFERENCE TO RELATED APPLICATIONS

This application is a continuation of U.S. patent application Ser. No. 10/648,424 filed on Aug. 25, 2003, the contents of which are incorporated by reference herein in their entirety.

BACKGROUND OF THE INVENTION

The present invention relates generally to quality monitoring activities, and more particularly, the invention relates to a method, system, and computer program product for providing web-based quality assessment, tracking, and reporting services for call monitoring.

Call centers are widely known and utilized in providing customer services such as product/service ordering, product/service information, repairs, billing questions, and troubleshooting. In today's multi-media technology environment, these services are being provided not only by telephone, but electronically through digital media as well. Customers value the flexibility in determining what communications channel they prefer for contacting a call center. Large businesses, particularly global enterprises, often outsource their call centers to one or more third parties who can provide these customer services, freeing up valuable resources for the businesses to focus on their industry.

Call monitoring occurs where a provider of customer services wishes to perform quality control functions in order to train and evaluate customer representatives of the call center and to ensure customer satisfaction. Automated call distribution systems (ACDs) provide the functionality that allows call monitors to listen in on live or recorded calls for monitoring purposes. The call monitor then provides feedback to the call representative or representative supervisor. This feedback is generally performed manually in the form of hand written or typed evaluation forms.

It is clear that such a system for monitoring calls and providing feedback would not be feasible for large global enterprises and businesses that outsource their customer services.

What is needed, therefore, is a way to provide efficient call monitoring services for large businesses that outsource their customer service activities and for global enterprises that require widespread geographic monitoring of customer services.

SUMMARY OF THE INVENTION

Embodiments of the present invention include a method, system, and computer program product for providing web-based quality assessment, tracking, and reporting services for call monitoring activities. The method includes presenting a main menu of user-selectable options via the evaluation services system over the web-based network. The user selectable options include a call monitoring option for requesting an evaluation of a call representative and a search option for searching completed call monitoring forms resulting from call monitoring sessions. The method also includes receiving a selection from the user-selectable options and presenting to a call monitor system, in response to selection of the call monitoring option, a call monitor form template over the web-based network.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES:

FIGS. 4A-4B are sample screen displays on a call monitor system illustrating a call monitor form template provided by the evaluation services system in exemplary embodiments.

DETAILED DESCRIPTION OF THE INVENTION

Figure 1:
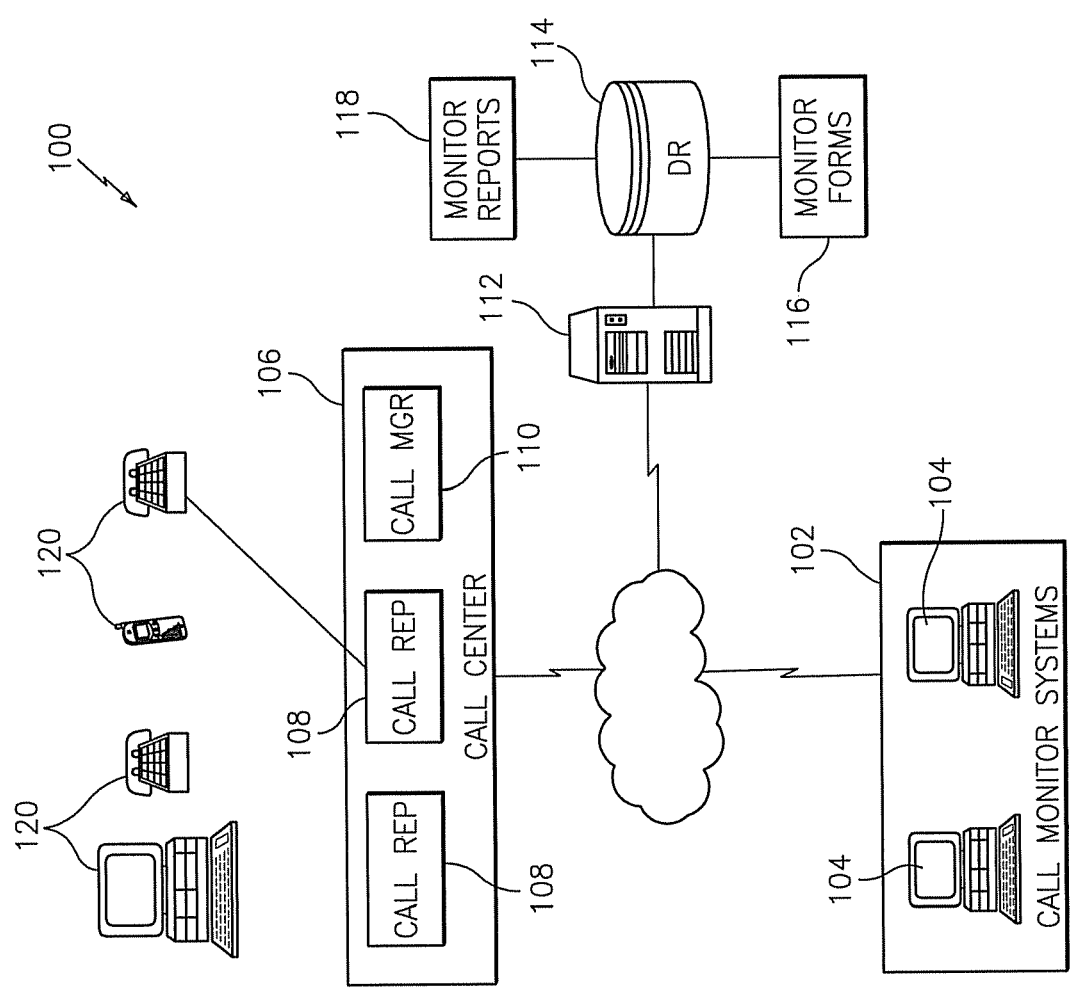
FIG. 1 is a block diagram of a system upon which the evaluation services system is implemented in exemplary embodiments.

The customer services provided in system 100 of the invention may include any multi-media communications or channels and may be implemented over any functionally compatible networking infrastructure. Customer services include product/service ordering, repairs, billing queries, technical assistance and troubleshooting, etc. Call monitoring of these customer services is performed over a network such as system 100 whereby call monitor systems 104 contact call center 106 and evaluate incoming calls from customers, either live or recorded. Call monitor systems 104 access the evaluation services system over the World Wide Web (WWW), retrieve monitor form templates 116 based upon initiatives established for the type of call center being monitored, and enter data into the form 116 which is then saved and retrievable via the Web.

Embodiments include a business enterprise 102 that outsources its customer services to third parties whereby a call center such as call center 106 represents a vendor providing these customer services on behalf of the business enterprise 102. Business enterprise 102 represents any entity or establishment that provides or is positioned to provide customer services in the form of sales, billing, technical assistance, telemarketing, and related assistance.

Call center 106 represents a source of information for external customers. Call center 106 may operate multi-media enabled automatic call distribution service (hereinafter referred to as "ACD service") that utilizes computer telephony integration (CTI) technology. The ACD component of call center 106 incorporates analog transmissions with digital data via switching technologies and routing devices that provides automatic distribution of incoming calls to individual representative systems 108. In this manner, communications from customers to the call center 106 can be accomplished in voice, data, or both.

Call monitor systems 104 may comprise general-purpose computer devices such as workstations. Call monitor systems 104 are web-enabled; that is, they include web browser technology for accessing web pages over the WWW such as from server 112. Call monitor systems 104 are in communication with call center 106 and may conduct live or recorded monitoring sessions. In one embodiment, a call monitor system 104 may receive notification that a call has been routed by the ACD to a representative system 108 whereupon the call monitor system intercepts a live call. In another embodiment, a call monitor system 104 may be given a number for a specific call center 106, which then connects the call monitor system 104 to the call center 106, and provides the call monitor system 104 with access to incoming calls that occur between a customer calling device such as one of calling devices 120 and one of call representative systems 108. In another embodiment, a call monitor system 104 accesses a recorded call that has been saved in a media storage location either at call center 106 or over a network in data repository 114. Call monitor systems 104 may communicate directly with call representative systems 108 and call manager system 110 or may communicate via a computer network, such as a local area network (LAN), wide area network (WAN), an Extranet, virtual private network (VPN), and/or the Web. Information monitored in a call may be in analog or digital form either via a voice system, computer device, or a combination of the above.

Operators of call monitor systems 104 enter scoring or evaluation data onto a web-based monitor form template 116 and save the data to data repository 114 which is accessible to corresponding call centers 106 over the Web. Call monitor systems 104 and/or call representative systems 108 and call manager system 110 may have access to other features of the evaluation services system including searching data repository 114 for completed monitor forms, editing capabilities for completed monitor forms, and report generation. Calls may be recorded and attached to call monitor forms for coaching and feedback purposes if desired.

Call representative systems 108 perform call center activities associated with the type of customer service being performed. For example, a call center may provide help desk functions whereby customers call in for a specific type of information. Another call center may provide assistance with customer billing inquiries. A third type of call center may schedule service repairs and troubleshooting activities. The ACD and/or the phone number or text address may provide some of the routing functionality in determining which call center is to be contacted. Call representative systems 108 may comprise general-purpose computer devices such as workstations and/or telephones.

Call manager system 110 is operated by a manager or supervisor for the call center who oversees the monitoring activities of the call representatives and acts as a liaison between the call center 106 and the business enterprise 102. Call manager system 110 may comprise any web-enabled, general-purpose computer devices such as a workstation and executes email software for communicating with business enterprise 102. Call manager system 110 accesses completed monitor forms stored in data repository 114 for use in training and evaluating call center representatives.

Server 112 executes the evaluation services system as well as web server software and includes email capabilities. Server 112 is in communication with business enterprise 102, call monitor systems 104, and call center 106 via any communications network. Server 112 transmits monitor form templates 116 to call monitor systems 104 via the Web and receives completed monitor forms from monitor systems 104. Server 112 automatically generates and transmits emails to call center 106 when certain criteria are met during a monitoring session. This feature is described further herein. Server 112 may comprise any suitable high-speed processor or mainframe capable of handling the volume of monitoring activities performed by the evaluation services system.

Data repository 114 stores completed monitor forms and reports 118 generated by the evaluation services system. Data repository 114 comprises any electronic storage medium that is logically addressable to call center 106 and business enterprise 102.

Calling devices 120 are operated by customers of business enterprise 102. Calls may be in the form of audio that is placed by telephone over a public switched telephone network (PSTN) to a private branch exchange (PBX) in the call center 106. The ACD then communicates with the PBX and distributes the call to a call representative system 108. Where a calling device is a desktop computer, laptop, or portable handheld device, a data transmission is sent over a computer network such as the Internet and processed by the multimedia ACD. The calling devices 120, whether digital text-based or voice analog, can transmit calls to calling center 106 over a wireless and/or wireline network as will be understood by those skilled in the art.

Monitor form templates 116 reside in a database in data repository 114. Monitor form templates 116 are tailorable to reflect a prescribed set of initiatives directed to a specific type of customer service. Initiatives provided in monitor form templates 116 may be directed to a help desk service, customer billing, service and repair, sales, or other suitable service. The evaluation services system may be configured with a hover function that allows a call monitor or call representative to gather additional information about a particular initiative by placing a cursor on the desired initiative causing a general description of the initiative to appear on the computer screen. Additionally, by clicking on the initiative, a more detailed description of the initiative may be presented to the user on the computer screen.

Figure 2:
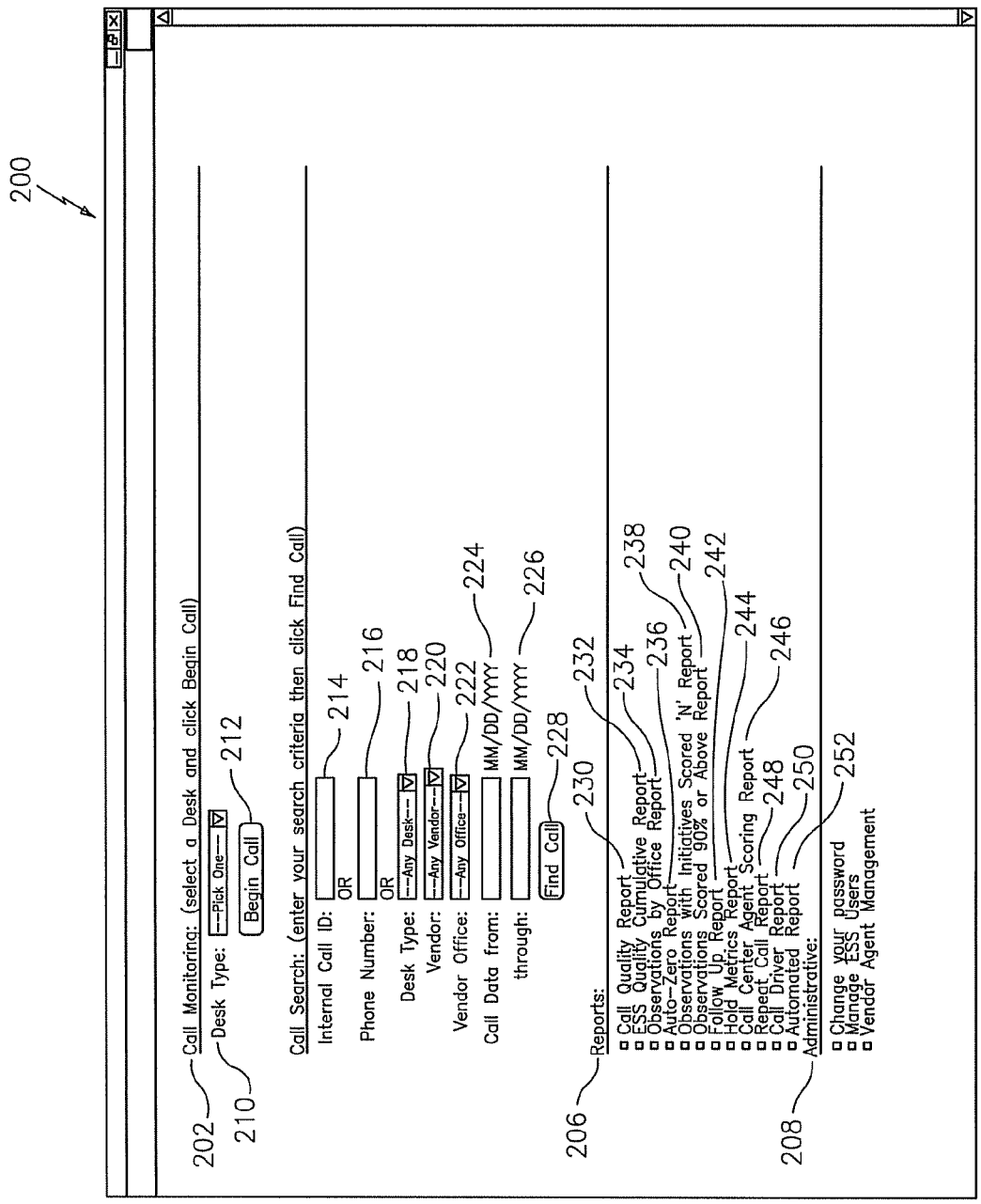
FIG. 2 is a sample screen display on a call monitor system illustrating options available via the main menu of the evaluation services system in exemplary embodiments.

Monitor reports 118 are generated by the evaluation services system in response to requests from authorized individuals from call center 106 and/or business enterprise 102. A variety of reporting information can be accessed using these reports and are described in FIG. 2.

Alternate embodiments include outsourcing the evaluation services system activities to third party vendors whereby call monitor systems 104 are operated by a call monitor vendor system 102 rather than the business enterprise. Communication between call monitor vendor system 102 and call center 106 may occur via a secure Extranet architecture. In this embodiment, call center 106 may be manned by individuals of the business enterprise, by a third party vendor, or a combination thereof.

Alternate embodiments include a global business enterprise 102 whereby call monitoring is not outsourced to third parties but is instead conducted by internal divisions of the enterprise that are geographically dispersed. Call centers 106 are operated by employees of the business enterprise and may be in direct communication with the business enterprise via a secure Intranet network architecture. A server 112 is operated by the business enterprise, and may be located in a central or corporate office along with data repository 114. Server 112 may be accessible to authorized individuals of the business enterprise via a secure network architecture.

The evaluation services system allows an authorized call monitor to select live or recorded calls for monitoring, as well as provides searching functions for previously completed monitor sessions. Web-based monitor form templates are retrievable over the Web for call monitors to enter data about the call sessions. The evaluation services system further allows authorized individuals to generate and view reports, as well as perform certain administrative functions. In the computer screen 200 of FIG. 2, a sample main menu is provided illustrative the various options available to an authorized user. A user may select call monitoring 202, call search 204, reports 206 and administrative 208 functions as described herein. The call monitoring function 202 is described in FIG. 3.

The call search 204 function allows an individual to retrieve a completed monitor form for a previously conducted call monitoring session. The evaluation services system is preferably configured to permit only authorized users to view these completed monitored forms. For example, a call monitor may be authorized to view only those completed monitored forms for which the call monitor authored. Likewise, a call representative may have access to completed call monitor forms where the evaluation was performed on him/her. A manager of the call representative may have access to completed call monitor forms for all subordinates.

An individual may initiate a call search by internal call ID 214, customer phone number 216, or service type 218. Internal call ID 214 refers to a unique identifier assigned to a customer call. Further, an individual may search for all calls associated with a specific vendor 220, vendor office 222, and may select all calls occurring within a specified date range 224, 226. Once the criteria has been selected, the individual depresses the 'find call' button 228 whereby the evaluation services system retrieves the associated completed monitor form(s) from data repository 114 and presents them to the individual via the Web.

Call reports 206 function allows authorized individuals to generated customized reports based upon information entered in completed call monitoring forms. Examples of some report types are listed below.

A Call Quality Report 230 provides a summary of how a group of individuals associated with a specific customer service, complies with a set of initiatives that correspond with that customer service. For example, where 2,000 calls were monitored for a help desk that spans one or more vendor call centers, 500 of these calls were answered with an incorrect greeting. In the nonconformance areas of the call quality report, a user can click on an initiative and the evaluation services system will display common causes and common solutions for that initiative.

A Quality Cumulative Report 232 provides an overview of scores by vendor, location, and manager, regardless of the type of customer service provided. This report can be generated to show results over a given time period.

Observations by Office Report 234 allows a user to view observations completed for a specific individual over a period of time.

Auto-Zero Report 236. Certain initiatives can be classified as critical in that they should be followed by call representatives to ensure a minimum level of quality assurance. For example, a customer repair representative schedules an in-home repair service for a customer and fails to inform the customer of the fees for this service. If the initiative is flagged by the call monitor for a session, the monitor form will reflect a 'zero' score indicating a critical error was made during the call. The evaluation services system retrieves the monitor forms where the critical initiative has been flagged and presents the data in this report.

Observations with Initiatives Scored 'N' Report 238. This report provides information regarding which initiatives are not being complied with as a whole based upon a pass/fail score. The report lists all calls by vendor and subgrouped by calls with an attribute score of 'NO.'

Observations Scored 90% or Above Report 240. This report provides information regarding the calls that have passed the scoring criteria used in monitoring the call centers.

Follow Up Report 242. Where a call monitor determines that a follow up call to a customer is required, the call monitor checks the monitor form to indicate the follow up as well as the time for following up in order to track ongoing issues and resolutions.

Hold Metrics Report 244 provides information regarding the average on-hold time a customer is placed on hold throughout the call. This information can be sorted by call representatives.

Call Center Agent Scoring Report 246 allows a user to view call data by agent or vendor and may sort the information by date.

Repeat Call Report 248 allows a call monitor to select a call by customer for anticipated future activity. This is helpful in situations where chronic or persistent problems or issues arise with a particular customer.

Call Driver Report 250 allows a user to analyze the reasons customers are calling. The report provides statistical data of why customers have called (e.g., hardware problems, software problems, email issues, etc.)

Automated report 252 provides a summary of all calls rated 100% and/or 0%. In these cases, an automatic email may be generated and transmitted to the relevant call center manager who is responsible for the call representative.

Administrative function 208 allows an individual to change a password, manage evaluation services system users, and manage vendor agents.

Figure 3:
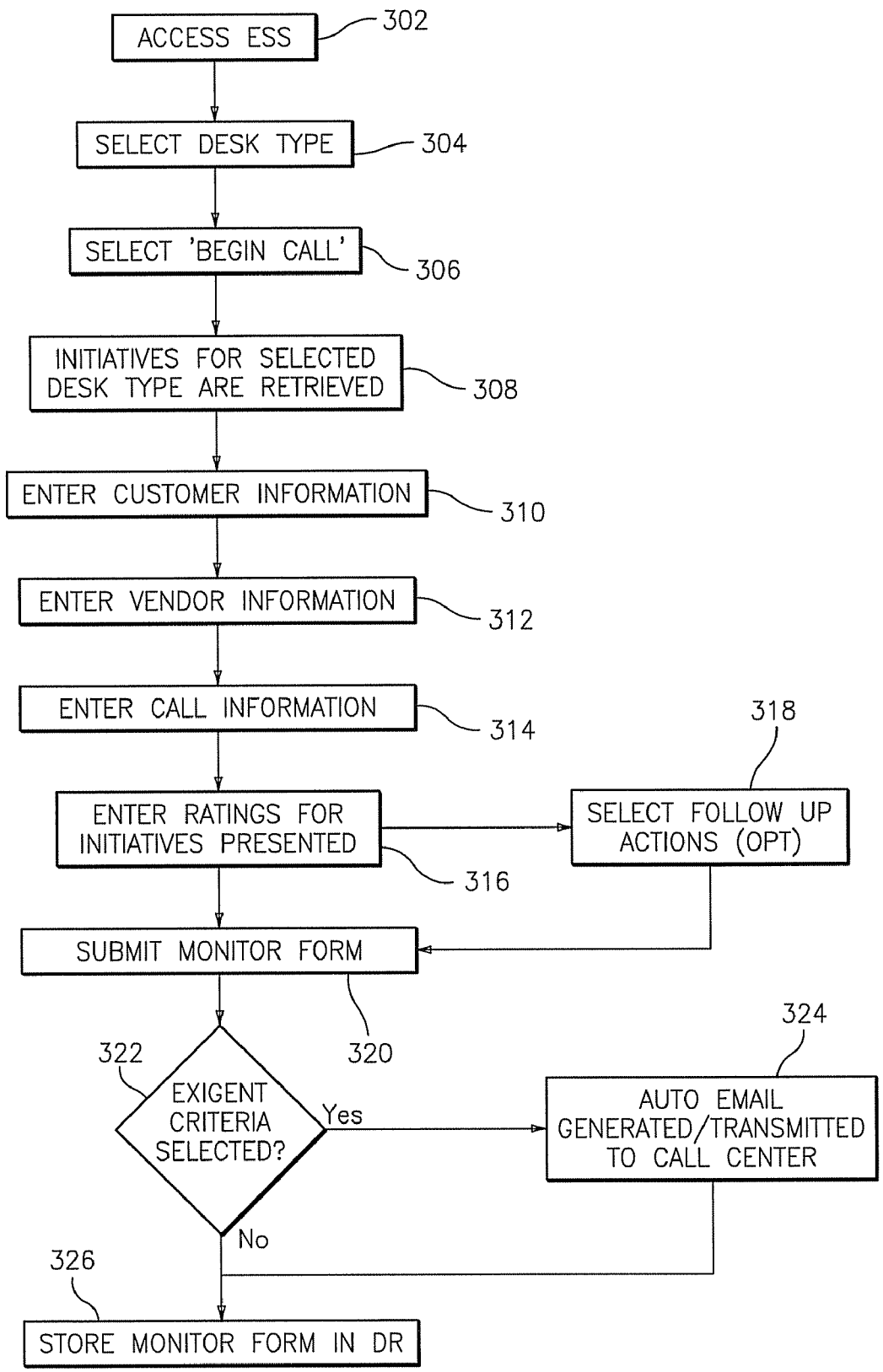
FIG. 3 is a flowchart describing the process of initiating a call monitoring function of the evaluation services system in exemplary embodiments.
Figure 4A:
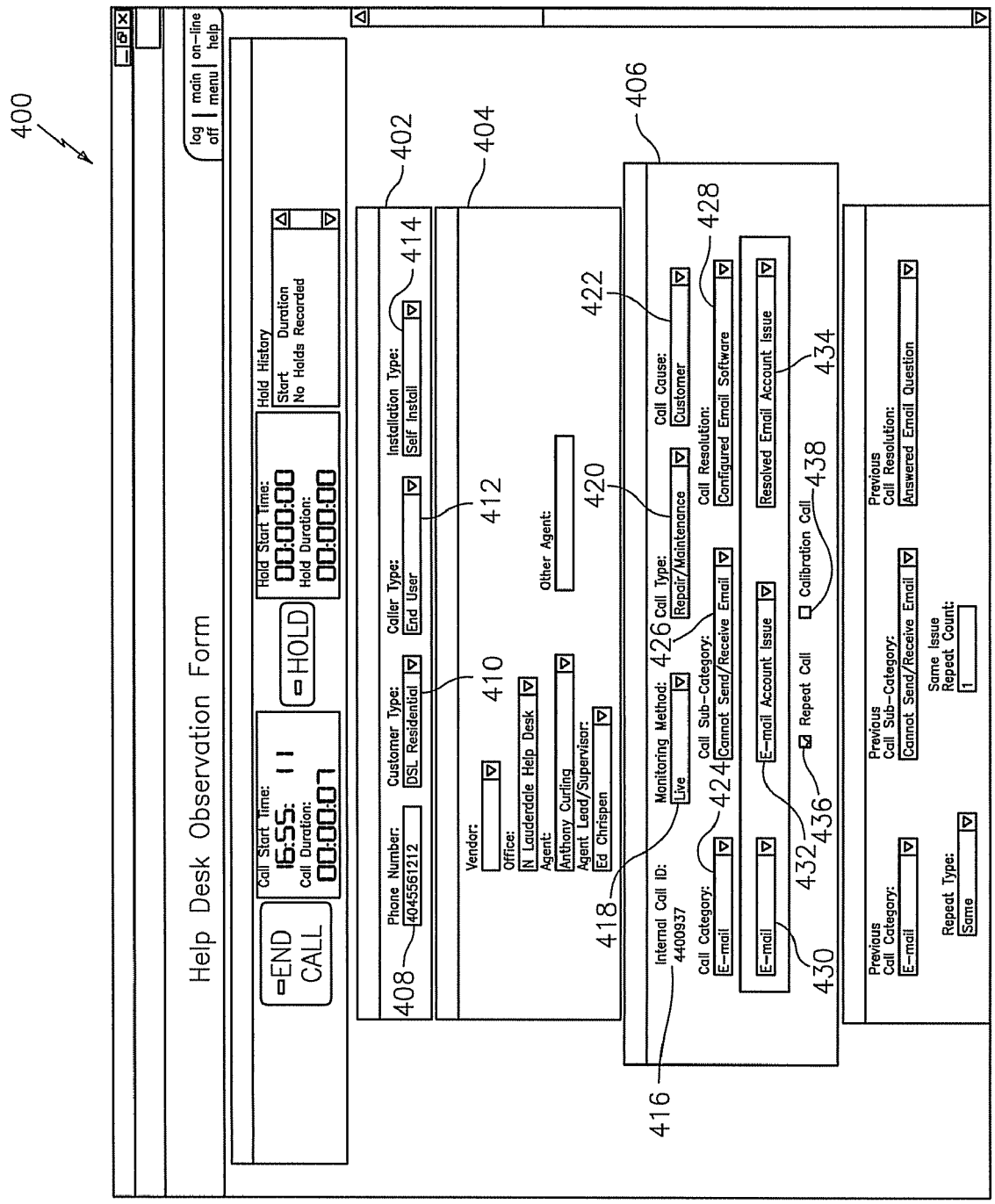

As indicated above, the evaluation services system allows an authorized call monitor to evaluate live or recorded calls via a Web-based scoring application. FIG. 3 describes the process of utilizing the Web-based evaluation services system solution for scoring monitored calls. Steps 302-312 relate to computer screen 400 of FIG. 4A. A call monitor accesses the evaluation services system over a network at step 302 and selects the desk type (also referred to as service type) function 210 of call monitoring function 202 at step 304. A drop down box allows the user to select a service type. The individual selects "begin call" 212 at step 306. The evaluation services system retrieves the appropriate monitor form template 116 associated with the initiatives established for the customer service type 210 and presents the monitor form template 116 to the user via a computer screen window 400 at step 308 as shown in FIGS. 4A-4B. The operator of call monitor system 104 and/or the caller representative system 108 enters customer information 402 to identify the customer to be monitored at step 310. Customer information includes a customer phone number 408, a customer type 410, a caller type 412, and an installation type 414. Customer type 410 allows a call monitor or call representative to distinguish between residential and business customers as well as identify the specific service associated with the call where more than one service type is provided by the business enterprise. Examples of service types include PBX phone services and DSL. A caller type 412 allows a call monitor and/or call representative to distinguish between callers who are employees of the business enterprise or third party vendor system and callers who are non-employee customers. Installation type 414 allows a call monitor and/or call representative to identify whether a 'professional installation' or 'customer installation' occurred with respect to the subject matter of the call. Installation type 414 further allows a call monitor and/or call representative to identify whether an installation was performed via CD-ROM or was manually performed.

The operator of call monitor system 104 then enters information 404 regarding the vendor associated with the calling center to be monitored at step 312. The operator further enters call information 406 at step 314. Call information 406 includes a call ID 416, a monitoring method 418, a call type 420, a call cause 422, a call category 424, a call subcategory 426, a call resolution 428, and CRM call category 430, CRM call sub-category 432, and CRM call resolution 434.

Call ID 416 identifies a particular call session. Every call received by a calling system 120 has a unique call ID 416 associated with it. Data in fields 418-428 is entered by a call monitor while evaluating a call representative. The data in fields 430-434 is entered by a call representative while communicating with a customer. The call monitoring method 418 includes a 'live' option and a 'recorded' option whereby the call monitor selects a live call or a recorded call to monitor. Call type 420 allows calls to be classified in one of four ways: activation, maintenance, misdirected, misdirected/handled. Activation refers to a call that is placed before customer installation has occurred. Maintenance refers to call that is placed after installation has occurred. A misdirected call is one that was placed to the wrong service desk and a misdirected/handled call refers to one that was placed to the wrong service desk but handled by the call representative. Call cause 422 allows a call monitor to indicate a problem source. For example, where a customer has forgotten a password, the problem source is on the customer end. Whereas, where a cable was severed during a professional installation, the problem source is the business enterprise. Call category 424 elements vary by service desk. For example, in a help desk service, a call category might be hardware, software, network, etc. Call categories in field 424 may be further classified into sub-category via sub-category 426 if desired. Call resolution 428 allows a call monitor to indicate the solution prescribed for this customer.

Data in fields 430-434 are entered by a call representative and provide a dual system for auditing customer calls. The data entered in CRM blocks 430-434 by the call representative can be used as a check to ensure that call representatives are correctly handling customer calls and correctly classifying and diagnosing customer issues. For example, where a call representative has entered a call category as hardware related but the call monitor has entered the call category as network related, the discrepancy is noted by the evaluation services system for improving customer relationship management between call representatives and customers.

A repeat call function 436 is a tracking function and is checked when a call monitor desires to follow up on a customer issue at a future time. Once selected, a window appears whereby the call monitor may select a future time for following up. When performing a follow up, the call monitor may determine whether the reason for the call is the same as the first or whether the customer is facing a new problem. Calibration call function 438 allows a call monitor to indicate when two call monitors are simultaneously evaluating a call. This situation occurs where call monitors from the business enterprise and call monitors from a third party vendor are sharing call monitoring activities. To ensure that the two monitoring entities are in synch; that is, that their scoring practices are calibrated, a monitor from one entity and a monitor from the other entity will simultaneously monitor a call representative. Each monitor will have a separate call monitor form and by checking the calibration call function 438, the evaluation services system uses only one of the monitor forms in calculating the score for the call representative, thus, eliminating any duplication.

The operator of call monitor system 104 next enters the information provided in computer screen 400 of FIG. 4B in accordance with the observations noted during the monitor session at step 316. Four sample initiatives 440-446 and their corresponding attributes 448 are shown along with sample scoring via evaluation columns 'N/A' 450, 'Yes' 452, and 'No' 454. These evaluation columns allow the call monitor to indicate whether objectives and attributes provided in the initiatives have been satisfied. A comments block 455 is included in the call monitor form template 116 for allowing the call monitor to enter specific comments regarding the observations made as well as for explaining any scores that indicate a non-compliance event has occurred. In addition, selected initiatives can be further exploited by providing pop-up boxes that provide additional detail that allow the call monitor to further describe the reason for the particular rating of the initiative. For example, where a 'professional closing' initiative is marked 'NO', a pop-up box appears with further details such as "did not thank customer for call" or "did not offer additional help." The call monitor then selects the appropriate sub-reason. Also, the evaluation services system includes functionality that ensures maximum response content from a call monitor by displaying an error message when a call monitor has not entered data for selected data fields deemed critical by the business enterprise. In this manner, the monitor form may not be submitted until such critical data fields have been addressed. Initiatives and/or attributes may also be configured so that those initiatives or attributes that are deemed critical to achieving customer satisfaction can be flagged whereby the evaluation services system automatically generates and transmits a notification to the manager system 110 or other supervisory agent where a non-conformance event occurred for use in training the customer representative who caused the non-conformance. Flagging these initiatives and attributes also allows for easy report generation that provides details about the non-conformance and/or non-conformance patterns.

A call timer function 456 is provided via the evaluation services system which tracks the duration of the call and provides insight on the call's hold history. The hold history function 458 may be used by the call monitor to track the amount of time a customer has been placed on hold by the call representative. The call timer function 456 and hold history function 458 may be accomplished using an internal clock feature incorporated into the evaluation services system tool.

At any time during the monitoring session, the call monitor may determine that a follow up monitoring session may be required or desirable where the subject of the call indicates that a matter has not been resolved during the call, or where the call representative has committed to the customer that he/she will follow up with the customer. In this manner, the call monitor may wish to check to see if the call representative in fact followed up with the customer. This follow up feature 460 is performed by checking 'follow up required' 462 at step 318. The call monitor may enter a follow up date in block 464, as well as the follow up reason in block 466, and follow up description in block 468. Once completed, the monitor form is submitted to the evaluation services system application on server 112 via the Web at step 320 by selecting the 'submit' button 470. As described above, if certain exigent or critical criteria have been flagged by the call monitor at step 322, the evaluation services system generates and sends an email or similar notification to the relevant call center manager or other supervisory agent at step 324. The completed monitor form is stored in data repository at step 326.

As can be seen from the above descriptions, various types of customer services are provided by any multi-media communications channels by the evaluation services system. Call monitoring is performed over a network where incoming calls are evaluated. Call monitor systems access the evaluation services system over the World Wide Web (WWW), retrieve monitor form templates based upon initiatives established for the type of call center being monitored, and enter data into the form which is then saved and retrievable via the Web. Reports can be generated and shared via the Web by selected individuals with proper access permissions.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

The invention claimed is:

1. A method for providing quality assessment services over a web-based network via an evaluation services system, the quality assessment services relating to call monitoring, the method comprising:
   presenting a main menu of user-selectable options via the evaluation services system over the web-based network, the user selectable options including:
      a call monitoring option for requesting an evaluation of a call representative; and
      a search option for searching completed call monitoring forms resulting from call monitoring sessions;
   receiving a selection from the user-selectable options; and
   presenting to a call monitor system, in response to selection of the call monitoring option, a call monitor form template over the web-based network.

2. The method of claim 1, wherein the call monitor form template includes:
   data entry fields operable for identifying at least one of:
      a call being monitored;
      a customer initiating the call; and
      a call representative receiving the call; and
   initiatives and scoring data fields operable for receiving evaluation data from the call monitor system.

3. The method of claim 2, further comprising:
   flagging an initiative in one of the initiatives data fields wherein the evaluation services system automatically assigns an overall failing score for a call session when a data entry field associated with the initiative indicates a nonconformance.

4. The method of claim 2, wherein the data entry fields for identifying a call being monitored includes at least one of:
   a monitoring method;
   a call cause;
   a call type;
   a call category;
   a call sub-category; and
   a call resolution.

5. The method of claim 2, wherein the data entry fields for identifying a call being monitored includes at least one of:
   a monitoring method;
   a call cause;
   a call type;
   a call category;
   a call sub-category; and
   a call resolution.

6. The method of claim 2, wherein the initiatives data fields include criteria for evaluating a call representative, the criteria associated with a service type selected by the call monitor system; wherein the service type includes at least one of:
   a service desk;
   a repair desk;
   a billing desk; and
   a sales desk.

7. The method of claim 1, wherein, in response to a selection of the search option for searching completed call monitoring forms, presenting data entry fields for enabling a search by at least one of a: call ID, calls by vendor, calls by vendor office, and calls occurring within a user-specified date range.

8. The method of claim 1, wherein the user-selectable options further include a report generation option for creating a report based on information entered in completed call monitoring forms.

9. A system for providing quality assessment services over a web-based network, the quality assessment services relating to call monitoring, the system comprising:
   a server; and
   an evaluation services system application executing on the server, the evaluation services system application implementing a method, comprising:
   presenting a main menu of user-selectable options over the web-based network, the user selectable options including:
      a call monitoring option for requesting an evaluation of a call representative; and
      a search option for searching completed call monitoring forms resulting from call monitoring sessions;
   receiving a selection from the user-selectable options; and
   presenting to a call monitor system, in response to selection of the call monitoring option, a call monitor form template over the web-based network.

10. The system of claim 9, wherein the call monitor form template includes:
   data entry fields operable for identifying at least one of:
      a call being monitored;
      a customer initiating the call; and
      a call representative receiving the call; and
   initiatives and scoring data fields operable for receiving evaluation data from the call monitor system.

11. The system of claim 10, wherein the evaluation services system application further performs:
   flagging an initiative in one of the initiatives data fields wherein the evaluation services system automatically assigns an overall failing score for a call session when a data entry field associated with the initiative indicates a nonconformance.

12. The system of claim 10, wherein the data entry fields for identifying a call being monitored includes at least one of:
   a monitoring method;
   a call cause;
   a call type;
   a call category;
   a call sub-category; and
   a call resolution.

13. The system of claim 10, wherein the data entry fields for identifying a call being monitored includes at least one of:
   a monitoring method;
   a call cause;
   a call type;
   a call category;
   a call sub-category; and
   a call resolution.

14. The system of claim 10, wherein the initiatives data fields include criteria for evaluating a call representative, the criteria associated with a service type selected by the call monitor system; wherein the service type includes at least one of:
   a service desk;
   a repair desk;
   a billing desk; and
   a sales desk.

15. The system of claim 9, wherein, in response to a selection of the search option for searching completed call monitoring forms, presenting data entry fields for enabling a search by at least one of a: call ID, calls by vendor, calls by vendor office, and calls occurring within a user-specified date range.

16. The system of claim 9, wherein the user-selectable options further include a report generation option for creating a report based on information entered in completed call monitoring forms.

17. A computer readable medium comprising computer program code for providing quality assessment services over a web-based network via an evaluation services system, the quality assessment services relating to call monitoring, the computer program code including instructions for causing a computer to implement a method, comprising:
   presenting a main menu of user-selectable options via the evaluation services system over the web-based network, the user selectable options including:
      a call monitoring option for requesting an evaluation of a call representative; and
      a search option for searching completed call monitoring forms resulting from call monitoring sessions;
   receiving a selection from the user-selectable options; and
   presenting to a call monitor system, in response to selection of the call monitoring option, a call monitor form template over the web-based network.

18. The computer readable medium of claim 17, wherein the call monitor form template includes:
   data entry fields operable for identifying at least one of:
      a call being monitored;
      a customer initiating the call; and
      a call representative receiving the call; and
   initiatives and scoring data fields operable for receiving evaluation data from the call monitor system.

19. The computer readable medium of claim 18, further comprising instructions for performing:
   flagging an initiative in one of the initiatives data fields wherein the evaluation services system automatically assigns an overall failing score for a call session when a data entry field associated with the initiative indicates a nonconformance.

20. The computer readable medium of claim 18, wherein the data entry fields for identifying a call being monitored includes at least one of:
   a monitoring method;
   a call cause;
   a call type;
   a call category;
   a call sub-category; and
   a call resolution.

* * * * *